United States Patent
Todd

(10) Patent No.: US 6,333,831 B1
(45) Date of Patent: Dec. 25, 2001

(54) COMBINATION LINEAR AND ROTARY HEAD CLEANER

(75) Inventor: Christian A. Todd, Thornton, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/422,884

(22) Filed: Oct. 21, 1999

(51) Int. Cl.[7] .................................................. G11B 5/41
(52) U.S. Cl. ............................................................... 360/128
(58) Field of Search ............................................. 360/128

(56) References Cited

U.S. PATENT DOCUMENTS 5,021,912 * 6/1991 Shao-Yung ........................... 360/128
5,671,108 * 9/1997 Clausen ................................. 360/128

* cited by examiner

Primary Examiner—Robert S. Tupper
(74) Attorney, Agent, or Firm—Brooks & Kushman P.C.

(57) ABSTRACT

A magnetic tape head cleaning system is provided that linearly moves a cleaner element across the surface of a read/write head while simultaneously using the liner displacement to rotate the cleaner element relative to the surface of the head. A cleaning mechanism includes a stationary post having a drive pin that engages a spiral cam slot in a rotary slide positioned to slide over the post. A linearly moving cleaner slide is mounted over the rotary slide to cause linear displacement of the rotary slide. As the rotary slide is displaced linearly, the drive pin and spiral cam slot cause the rotary slide to rotate. The rotation of the rotary slide in turn drives the cleaner element to rotate.

10 Claims, 5 Drawing Sheets

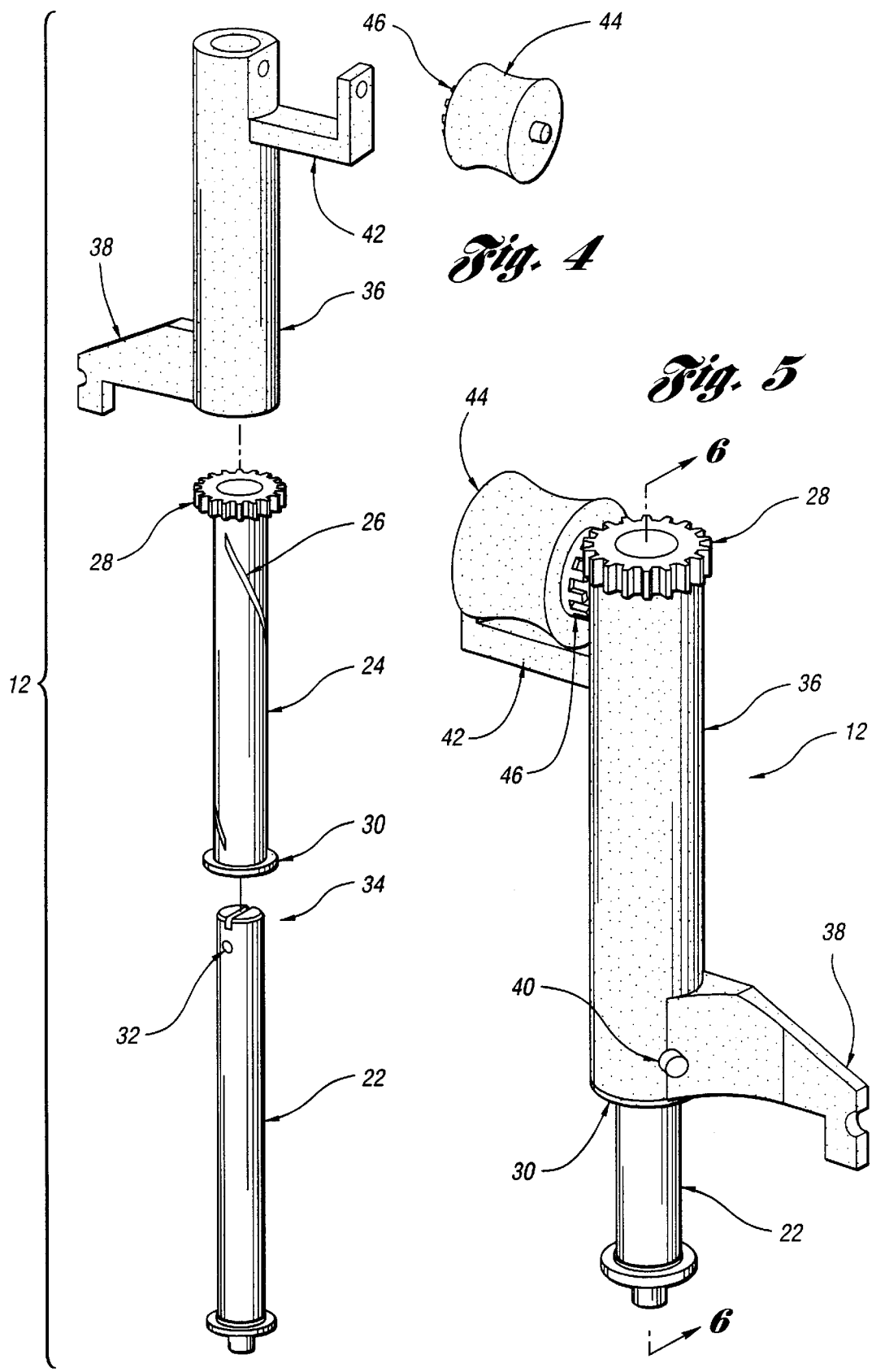

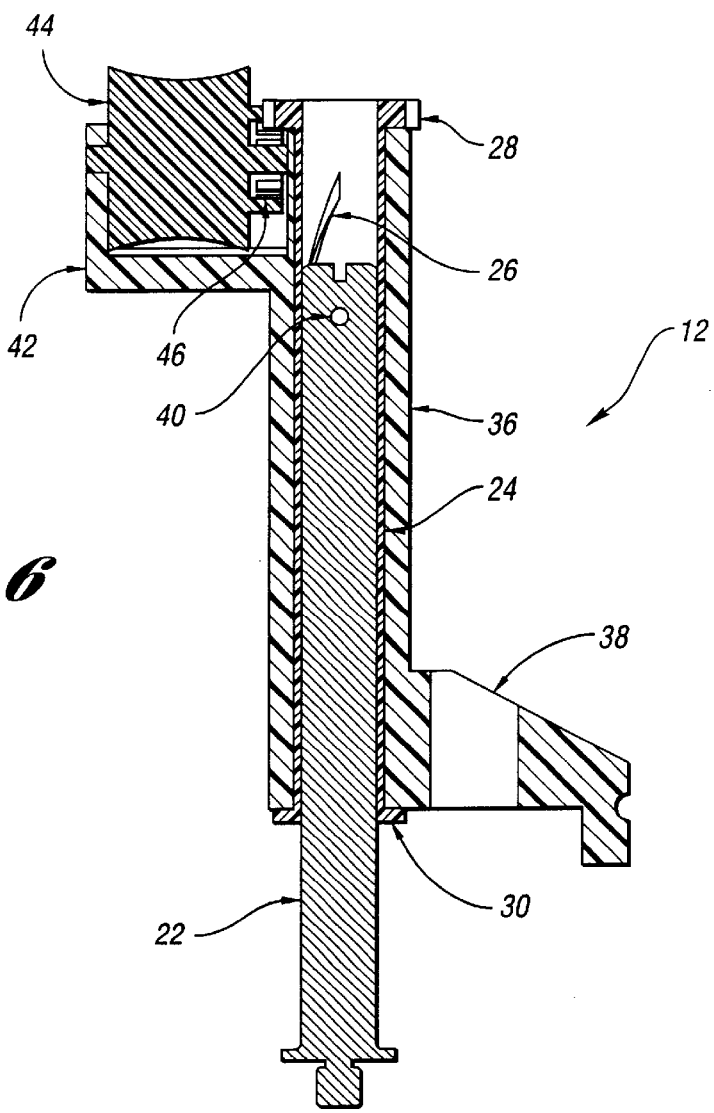
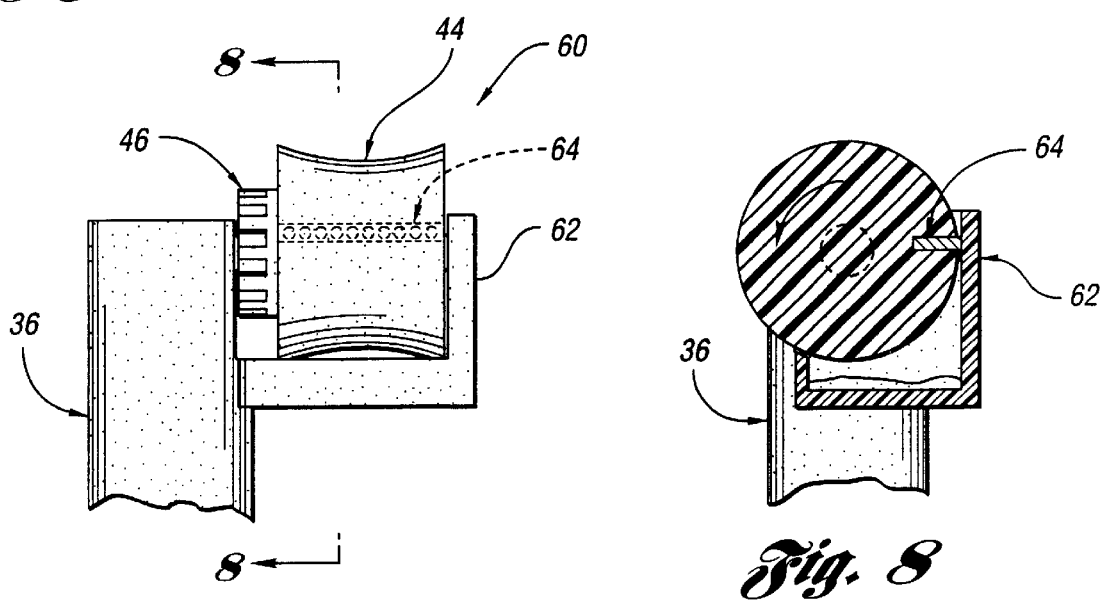

COMBINATION LINEAR AND ROTARY HEAD CLEANER

TECHNICAL FIELD

The present invention relates generally to magnetic tape head cleaning arrangements, and more specifically to a head cleaning arrangement suitable for use with high density read/write head arrangements.

BACKGROUND ART

Generally, a problem common to all types of magnetic tape systems is that, over a period of time and use, the magnetic heads and associated tape drive components within the system for writing to and reading signals from the magnetic tape media become covered with contaminants. One source of such contaminants derives from the tape material itself, which is typically formed from a substrate having multiple types of coatings applied thereto, all of which tend to decay during operation and storage of the tape. As a result, debris forms and accumulates on the head and other drive components. Because this accumulation can compromise the ability of the tape system to properly read to and write from the tape, routine cleaning of the tape system is required.

The accumulation of debris is particularly problematic in high density multi-track tape systems. More specifically, known high density multitrack magnetic tape systems employ magnetic read/write heads having slots or gutters formed therein to ensure a proper interface for reading and writing information to the tape. In conventional head arrangements, these gutters are positioned between respective read and write elements and oriented parallel to the direction of tape movement across the head. In order to maintain proper tape contact with the read and write elements during operation of the system, the gutters must be free from any debris. Since the orientation of the gutters is parallel to the direction of tape travel, one type of conventional tape cleaning cartridge has been developed which uses a cleaning media spooled onto a standard cartridge and run across the read/write head to clean accumulated debris and other contaminants from the gutters. This type of conventional cleaning cartridge device and variations thereof operate using a linear wiping motion in the same direction as tape travel.

However, such a cleaning arrangement has not proven wholly satisfactory. More specifically, such cleaning cartridges are capable of holding only a limited length of cleaning media, and therefore can be used only a small number of times before a new cleaning cartridge is required. In addition, such cleaning cartridge arrangements typically are not capable of removing debris from other tape drive mechanisms which operate to transport the tape across the head of the tape system, nor eliminate the potential for static discharge which can potentially damage electronic circuit components located in the tape system.

Further compounding the problem of debris removal in multi-track recording devices is that newer high density linear tape systems locate the respective read and write elements much closer together on the head. Such close placement prohibits positioning of gutters between the elements. As a result, the gutters are reoriented to extend in an orthogonal direction relative to the direction of tape motion. While such an orthogonal gutter orientation achieves the desired read/write interface, the orientation also allows debris to more readily accumulate. In addition, the orthogonal orientation does not lend itself well to cleaning by the aforementioned conventional wiping cartridge cleaning arrangements.

Alternative head cleaning approaches have attempted to clean the gutters using a single or dual brush mechanism arranged to be swept across the head orthogonal to the direction of tape movement. While such arrangements may provide improved performance over wiping-type cartridge cleaners, the brush mechanisms only operate to push debris along a gutter without actually insuring removal from the gutter or tape path. As a consequence, a need still exists for a head cleaning arrangement capable of efficiently cleaning gutters oriented orthogonal to the direction of tape while eliminating the inadequacies of known head cleaning arrangements.

DISCLOSURE OF INVENTION

It is therefore an object of the present invention to provide a head cleaning arrangement having greater efficiency in cleaning removing contaminants and other debris from a read/write head and drive mechanism of a magnetic tape system.

It is another object of the present invention to provide a head cleaning arrangement which can efficiently clean and remove contaminants and other debris from a magnetic tape system having a read/write head arranged with gutters or bleed slots extending orthogonal to the direction of tape movement.

It is yet another object of the present invention to provide a head cleaning arrangement which utilizes a combination linear and rotary cleaning mechanism to remove contaminants and other debris from a magnetic tape system.

In accordance with these and other objects, the present invention provides a magnetic head cleaning system having a cleaning element that is driven by a tape drive mechanism to slide across a surface of the head, while at the same time being driven to rotate relative to the surface of the head. More specifically, a cleaning system for a read/write head in a tape system having at least one tape drive mechanism for receiving tape cartridges includes a linear drive mechanism coupled to a drive gear that is actuated by the tape drive mechanism, and a cleaning mechanism having a cleaner slide element arranged to be linearly displaced relative to the head by the linear drive mechanism. A cleaning mechanism also includes a cleaner element that is rotatably mounted to the cleaner slide and positioned so as to be linearly moved across a surface of the head when the cleaner slide is linearly displaced. A rotary drive mechanism is arranged to be driven by the linear displacement of the cleaner slide to simultaneously rotate the cleaning element as the cleaning element linearly moves across the surface of the head.

In accordance with other aspects of the present invention, the cleaning element can be formed as a multi-media brush that alternately applies a set of bristles and pads to the head. In addition, the rotary cleaning device can be formed having bristles of varying stiffness or diameter on the same brush head. A debris "comb" or catching device can be attached near the bristles to prevent removed debris from falling into the tape deck.

The above objects, features, and advantages of the present invention are readily apparent from the following detailed description of the best mode for carrying out the invention when taken in connection with the accompanying drawings.

BRIEF DESCRIPTION OF DRAWINGS

FIG. 4 is an exploded view of the combination linear and rotary head cleaning element;

FIG. 5 is a perspective view of the combination linear and rotary head cleaning element shown in isolation;

FIG. 6 is a cross-section of the combination linear and rotary head cleaning element;

FIG. 7 is a diagram of an embodiment having a debris comb; and

FIG. 8 is a cross-section of FIG. 7 taken along line 8—8.

BEST MODE FOR CARRYING OUT THE INVENTION

Figure 1:
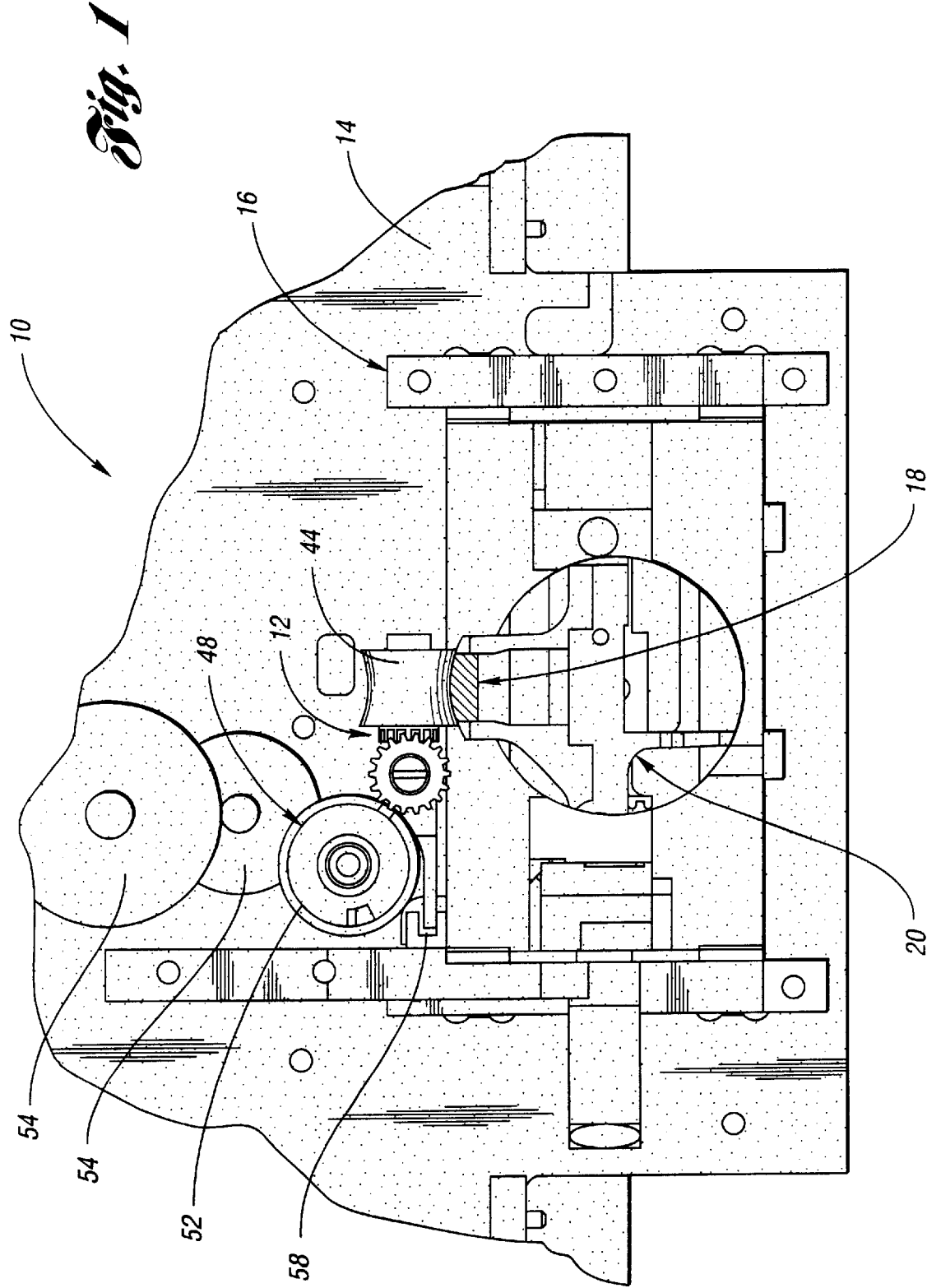
FIG. 1 is a top view looking down on a tape drive mechanism of a magnetic tape deck/system incorporating a combination linear and rotary head cleaning arrangement in accordance with the present invention.
Figure 2:
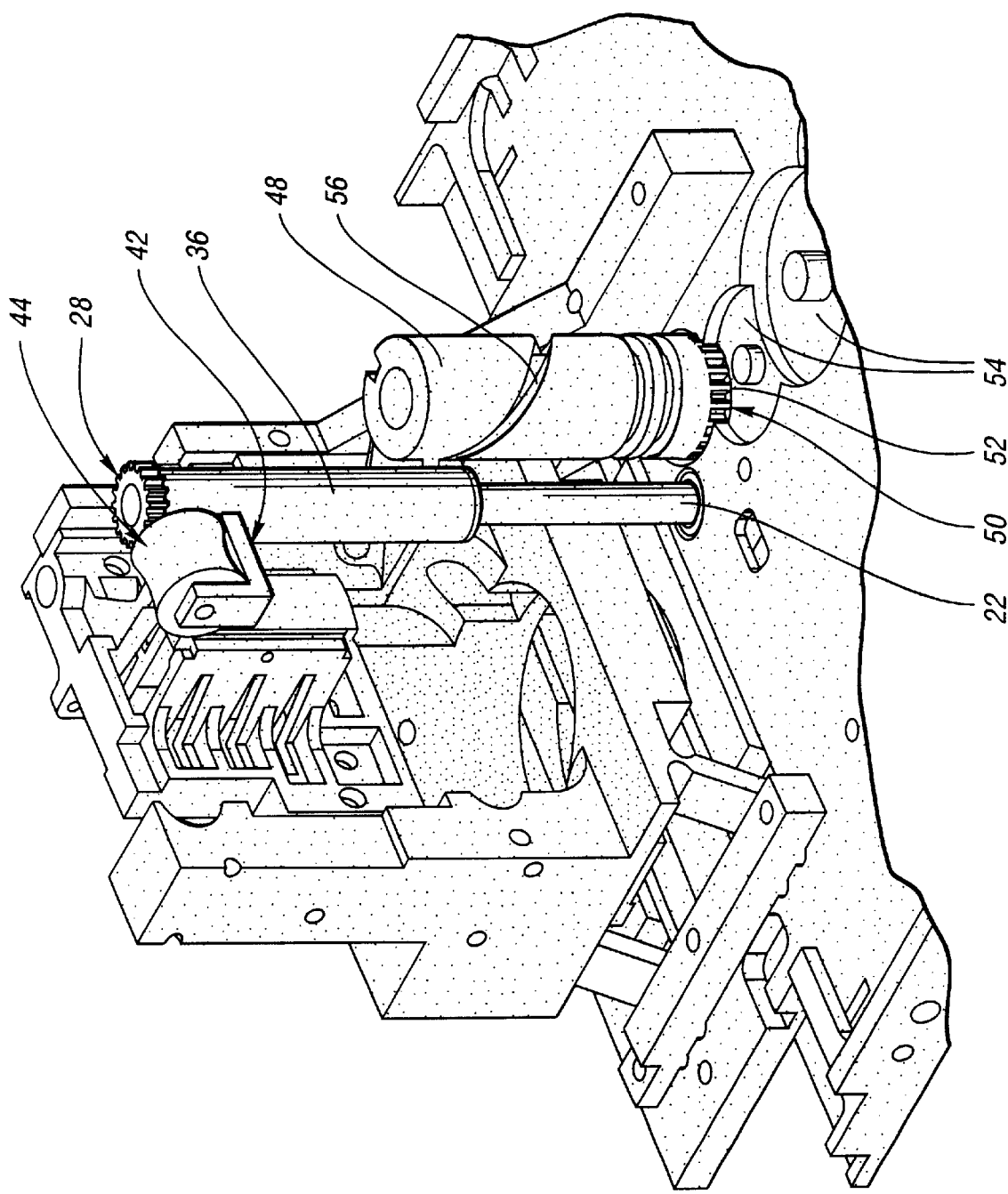
FIG. 2 is an elevated perspective view of the tape drive mechanism showing one side of the combination linear and rotary head cleaning arrangement of the present invention.
Figure 3:
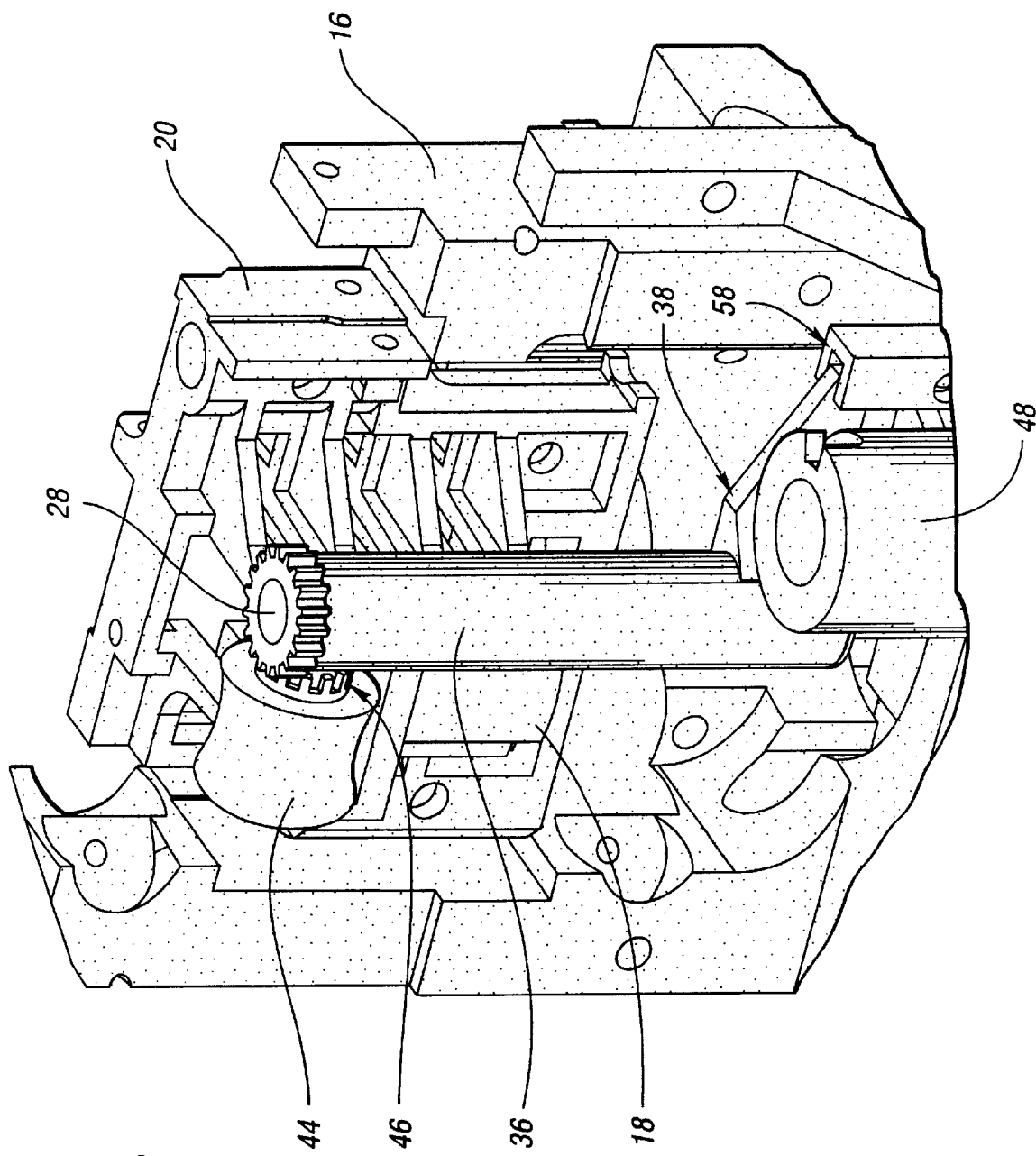
FIG. 3 is an elevated perspective view of the tape drive mechanism showing a different side of the combination linear and rotary head cleaning arrangement of the present invention.

Referring to FIGS. 1 through 3, a tape drive mechanism of a magnetic tape deck/system 10, e.g., a tape cartridge loading bay, is shown incorporating a combination linear and rotary motion cleaning element 12 in accordance with the present invention. As shown, the tape drive mechanism of tape deck 10 includes a baseplate 14 having a read/write head frame 16 mounted thereto. A magnetic head 18 head is mounted to a carriage 20, which is supported by head frame 16 so as to be properly positioned relative to a tape path when a tape cartridge is inserted in the tape deck. The carriage can be arranged to allow head 18 to move up and down perpendicular to the tape path. However, the present invention is equally applicable to tape drive mechanisms having a stationary head arrangement, and therefore, a moving head structure is not to be construed as limiting. In addition, as described below, the head cleaning arrangement of the present invention is particularly beneficial if head 18 is a high density read/write head arranged with gutters or bleed slots extending orthogonal to the direction of tape movement. However, this too is not to be construed as limiting.

As best seen in FIGS. 4 through 6, the combination linear and rotary motion cleaning element includes a stationary inner slide post 22, and an intermediate rotary drive member 24 that slides up and down over the slide post. Slide post 22 can be threadably secured to baseplate 14 of the tape deck. Rotary drive member 24 includes a spiral cam slot 26 formed within the side, a spur gear 28 affixed at one end, and a retainer flange 30 formed in the opposite end. Slide post 22 includes a drive pin 32 radially extending from the outer surface of the post and positioned near an outer end 34 thereof. Drive pin 32 nests within spiral cam slot 26 when rotary drive member 24 is positioned over the slide post.

An outer cleaner slide 36 completes the assembled cleaning element 12, and is arranged and dimensioned to fit about rotary drive member 24 and held in place between spur gear 28 at one end, and retaining flange 30 at the other end. Outer cleaner slide 36 includes an anti-rotation slide tab 38 (best seen in FIG. 5) radially from the outer surface of slide 36, and a slider drive pin 40 also radially extending from slide 36 near the end of slide 36 held by retaining flange 30.

A cleaner device retaining bracket 42 extends outwardly from one side of slide 36 at the end opposite of slider drive pin 40. Bracket 42 is arranged to axially support rotational movement of a cleaner device 44 mounted therein. Cleaner device 44 includes a face drive gear 46, which is held in engagement with spur gear 28 by bracket 42. The outer surface of cleaner device 44 can include one or more types of head cleaning surfaces. For example, cleaner device 42 can be formed as a brush. Other embodiments include forming cleaner device 44 as a multi-media brush that alternately applies a set of bristles and pads to the surface of head 18, the pads cleaning the tape contact surface and the bristles cleaning the gutters of head 18. Also, bristles of varying stiffness or diameter may be used on the same brush head, with at least some of the bristles sized to fit within gutters on head 18. A debris "comb" or other such catching device (not shown) can be attached to bracket 42 below the brush bristles to prevent removed debris from falling into the tape deck.

Referring again to FIGS. 1–3, a slide drive cam 48 is rotatably mounted to the base plate adjacent to cleaning element 12, and includes a gear 50 at the base plate end thereof. Gear 50 nests within a recess 52 formed within base plate 14. Gear 50 is positioned so as to be driven by a motor driven gear set (not shown) when one or more of the gears in the gear set are moved into engagement by an external controller during head cleaning operation. The moveable gear(s) nest within a base plate recess 54 that is dimensioned to allow gear(s) to engage with gear 50.

Slide drive cam 48 includes a spiral cam slot 56 formed within the side. Spiral cam slot 56 is arranged to engage slider drive pin 40 to cause outer cleaner slide 36 to move linearly relative to the tape path when slide drive cam 48 is rotated. Anti-rotation tab 38 rides along a slot 58 formed as part of the head frame, and prevents outer slide 36 from rotating as drive pin 40 rides along spiral cam slot 56. However, as outer slide 36 moves linearly in response to slide drive cam 48, the linear movement simultaneously causes rotary drive member 24 to rotate as spiral cam 26 rides about stationary drive pin 32 located on slide post 22. Rotation of rotary drive member 24 in turn causes spur gear 28 to drive face gear 46 to rotate cleaner device 44. When not in use, slide drive cam 48 displaces cleaning element 12 so as to move out of interference with operation of the tape drive mechanism when a tape cartridge has been inserted.

Referring now to FIGS. 7 and 8, in accordance with a further embodiment of the present invention, a debris comb or catching device 60 is attached to outer slide 36 near rotary cleaning device 44 so as to prevent removed debris from falling into the tape deck. More specifically, a mounting bracket 62 attaches to outer slide 36 and is arranged to form a pocket underneath rotary cleaning element 44. One or more comb elements 64 extend outwardly from bracket 62 so as to remove debris captured or embedded in the cleaning material of element 44. The debris is then collected in the pocket formed by bracket 62. In addition, the pocket can be magnetized so as to retain the collected debris. In addition or as an alternative, the comb can be magnetized in the proximity of element 44.

Thus, the combination linear and rotary head cleaning arrangement of the present invention lifts debris out of the gutters on a head rather than simply relying on pushing or wiping the debris along the length of the gutters. The simultaneous rotation of the cleaning element as it is moved linearly across the surface of the head provides a significant improvement in performance over a linear dual brush cleaning system employed in some tape decks.

It will be appreciated that the present invention is adaptable to meet a wide variety of different head configurations. Thus, while the best mode for carrying out the invention has been described in detail, those familiar with the art to which this invention relates will recognize various alternative designs and embodiments for practicing the invention as defined by the following claims.

What is claimed is:

1. A cleaning system for a read/write head in a tape system, the tape system having at least one tape drive mechanism for receiving tape cartridges, the cleaning system comprising:

a linear drive mechanism coupled to a drive gear actuated by the tape drive mechanism; and a cleaning mechanism comprising:

a cleaner slide element arranged to be linearly displaced relative to the head by the linear drive mechanism;

a cleaner element rotatably mounted to the cleaner slide and positioned so as to be linearly moved across a surface of the head when the cleaner slide is linearly displaced; and a rotary drive mechanism arranged to be driven by the linear displacement of the cleaner slide to simultaneously rotate the cleaning element as the cleaning element linearly moves across the surface of the head.

2. The head cleaning system of claim 1 wherein the cleaner element comprises a multi-media brush that alternately applies a set of bristles and pads to the surface of the head.

3. The head cleaning system of claim 1 wherein the cleaner element comprises a set of bristles of varying stiffness or diameter affixed to an outer surface thereof.

4. The head cleaning system of claim 1 further comprising a comb for catching debris loosened by the cleaner element.

5. The head cleaning system of claim 1 wherein the drive mechanism comprises a slide drive cam rotatably mounted to the tape drive mechanism adjacent the cleaner slide, the slide drive cam comprising a spiral cam slot formed within the side and arranged to engage a drive pin extending outwardly from the cleaner slide.

6. The head cleaning system of claim 5 wherein the cleaner slide further comprises a tab extending outwardly from the side and arranged to engage a stationary member on the tape system so as to prevent the cleaner slide from rotating as the slide drive cam rotates, thereby causing the cleaner slide to be linearly displaced as the drive pin engages the spiral cam slot.

7. The head cleaning system of claim 1 wherein the cleaning mechanism further comprises a stationary post mounted to the tape system, and wherein the rotary drive mechanism comprises a rotary slide positioned to ride over the stationary post, the rotary slide comprising a spiral cam slot formed within the side, a gear affixed at one end, and a retainer flange formed in the opposite end, wherein the stationary post comprises a drive pin extending outwardly and positioned to engage the spiral cam slot in the rotary slide.

8. The head cleaning system of claim 7 wherein the drive mechanism comprises a slide drive cam rotatably mounted to the tape drive mechanism adjacent the cleaner slide, the slide drive cam comprising a spiral cam slot formed within the side and arranged to engage a drive pin extending outwardly from the cleaner slide, and wherein the cleaner slide is positioned about the rotary slide by the retaining flange and the gear mounted to the rotary slide so as to linearly displace the rotary slide while simultaneously supporting rotation of the rotary slide.

9. The head cleaning system of claim 8 wherein the cleaner slide further comprises a tab extending outwardly from the side and arranged to engage a stationary member on the tape system so as to prevent the cleaner slide from rotating as the slide drive cam rotates, thereby causing the cleaner slide to be linearly displaced as the drive pin engages the spiral cam slot.

10. The head cleaning system of claim 8 wherein the drive pin of the stationary post engages the spiral cam slot of the rotary slide to cause the rotary slide to rotate as the rotary slide is displaced by the cleaner slide, wherein rotation of the rotary slide causes the gear attached thereto to rotate the cleaner element.

* * * * *